United States Patent
Abe et al.

(10) Patent No.: US 9,520,916 B2
(45) Date of Patent: Dec. 13, 2016

(54) VEHICULAR POWER LINE COMMUNICATION SYSTEM AND TRANSMITTER

(75) Inventors: Taiji Abe, Nishio (JP); Akira Takaoka, Okazaki (JP); Yuukou Murase, Nagoya (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 374 days.

(21) Appl. No.: 14/125,758

(22) PCT Filed: Jul. 18, 2012

(86) PCT No.: PCT/JP2012/004577
§ 371 (c)(1),
(2), (4) Date: Dec. 12, 2013

(87) PCT Pub. No.: WO2013/011686
PCT Pub. Date: Jan. 24, 2013

(65) Prior Publication Data
US 2014/0153655 A1    Jun. 5, 2014

(30) Foreign Application Priority Data

Jul. 21, 2011 (JP) ................................. 2011-159876

(51) Int. Cl.
*H02J 3/02* (2006.01)
*H02J 3/34* (2006.01)
(Continued)

(52) U.S. Cl.
CPC ......... *H04B 3/54* (2013.01); *H04B 3/56* (2013.01); *H04B 5/0018* (2013.01);
(Continued)

(58) Field of Classification Search
USPC ...................................... 307/3, 104; 375/257
See application file for complete search history.

(56) References Cited

U.S. PATENT DOCUMENTS 6,005,475 A * 12/1999 Takasan ............... B61L 3/225
                                                   104/88.03
8,288,893 B2   10/2012 Cook et al.
(Continued)

FOREIGN PATENT DOCUMENTS

JP    H2-34042 A    2/1990
JP    H10-256959 A    9/1998
(Continued)

OTHER PUBLICATIONS

Office Action dated Apr. 1, 2015 issued in corresponding DE patent application No. 11 2012 003 060.5 (and English translation).
(Continued)

*Primary Examiner* — Rexford Barnie
*Assistant Examiner* — Xuan Ly
(74) *Attorney, Agent, or Firm* — Posz Law Group, PLC

(57) ABSTRACT

An opening area between twisted portions of a pair of twisted wires is arranged to be opposite to an opening area of an aperture antenna of each of communication apparatuses. Thus, the use of the pair of twisted wires permits division of electric power among the communication apparatuses and also communication of signals. In particular, among the opening areas between the twisted portions of the pair of twisted wires, only an opening area, which is in between the twisted portion and the twisted portion and is opposite to the aperture antenna, is formed to be larger than a different opening area. This provides a vehicular power line communication system and a transmitter in the system; the system strengthens electromagnetic induction connection between the transmitter and the receiver to permit power line communication.

11 Claims, 8 Drawing Sheets

(51) Int. Cl.
  *H04B 3/54* (2006.01)
  *H04B 5/00* (2006.01)
  *H04B 3/56* (2006.01)
(52) U.S. Cl.
  CPC .......... *H04B 2203/5416* (2013.01); *H04B 2203/5445* (2013.01); *H04B 2203/5483* (2013.01)

(56) References Cited

U.S. PATENT DOCUMENTS

2010/0117454 A1* 5/2010 Cook .................. G06K 7/0008
                                                              307/104
2011/0307123 A1   12/2011 Abe et al.

FOREIGN PATENT DOCUMENTS

| JP | H10-256961 A | 9/1998 |
|----|--------------|--------|
| JP | 2004-193010 A | 7/2004 |
| JP | 2005-45327 A | 2/2005 |
| JP | 2005-141044 A | 6/2005 |
| WO | 20041054179 A1 | 6/2004 |
| WO | WO 2004054179 * | 6/2004 |

OTHER PUBLICATIONS

International Search Report of the International Searching Authority mailed Aug. 14, 2012 for the corresponding international application No. PCT/JP2012/004577 (with English Translation).

Written Opinion of the International Searching Authority mailed Aug. 14, 2012 for the corresponding international application No. PCT/JP2012/004577 (with English Translation).

Office Action mailed May 28, 2013 for the corresponding JP application No. 2011-159876 (with English Translation).

* cited by examiner

FIG. 7
(a) 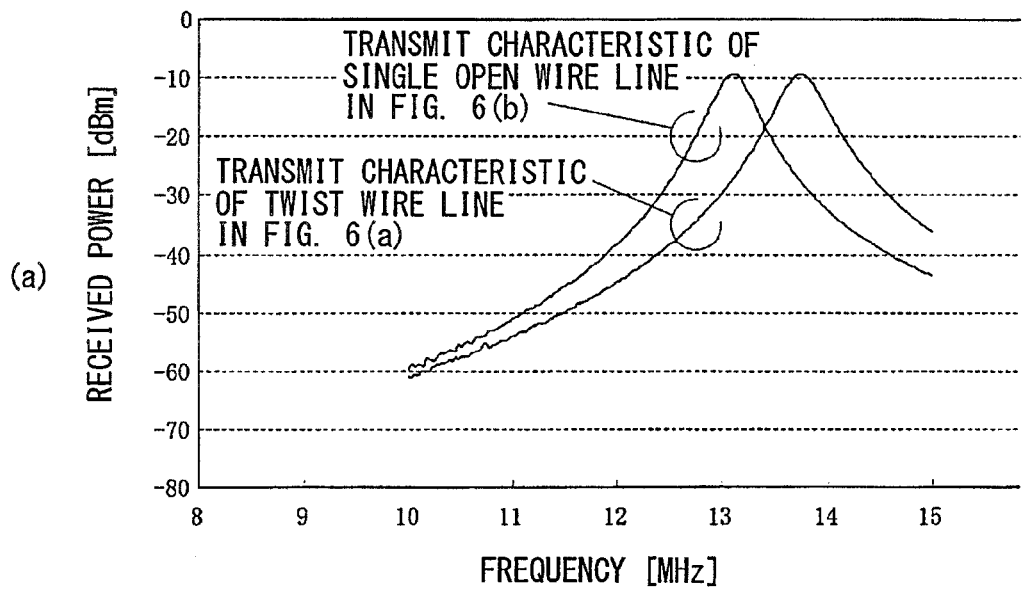
(b) 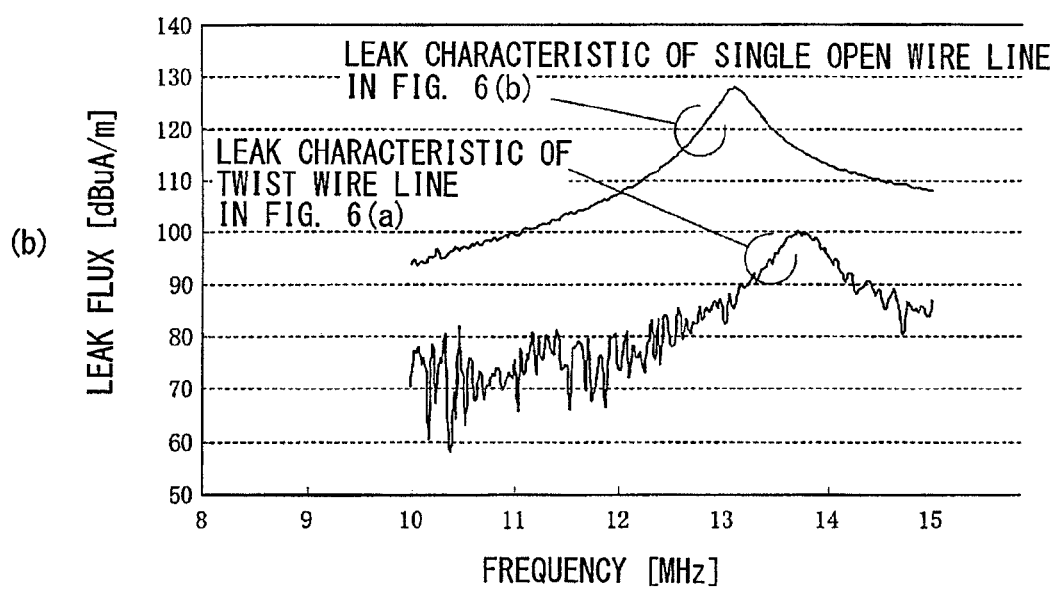

VEHICULAR POWER LINE COMMUNICATION SYSTEM AND TRANSMITTER

CROSS REFERENCE TO RELATED APPLICATIONS

This application is a U.S. national stage application of PCT/JP2012/004577 filed on Jul. 18, 2012, and claims priority to, and incorporates by reference, JP Patent Application No. 2011-159876 filed on Jul. 21, 2011.

TECHNICAL FIELD

The present disclosure relates to a vehicular power line communication system and a transmitter in the system, the system permitting a plurality of communication apparatuses to communicate using a power line.

BACKGROUND ART

There are known ECUs (Electronic Control Units) in a vehicle to communicate with each other to thereby perform various controls in the vehicle smoothly. Therefore, the introduction of the power line communication (PLC) system is considered. This power line communication system is a technology which superimposes signals on high frequency carriers to thereby transmit and communicate.

Such a technology is disclosed in Patent Literature 1. Patent Literature 1 describes a technology where a moving object is equipped with a balanced feeder line composed of two parallel wire lines. The balanced feeder line is in proximity of a coupler shaped of a loop. Thereby, the moving object and the balanced feeder line form an electromagnetic induction connection therebetween.

PRIOR ART LITERATURES

Patent Literature

[Patent Literature 1] JP 2005-45327 A

SUMMARY OF INVENTION

The inventors find that when electromagnetic induction connection is performed using a conventional technology to permit transmission of electric power or signals, much leakage flux arises in other than portions (connection portions) which transmits and receives the electric power and the signals.

The present disclosure is made in consideration of the above situation. It is an object to provide a vehicular power line communication system and a transmitter in the system. The system enables a power line communication by strengthening electromagnetic induction connection between a transmitter and a receiver.

According to a first example of the present disclosure, a vehicular power line communication system is provided as follows. A transmitter includes a pair of twisted wires, whose ends are connected to each other to be loop-shaped, as a power line and a communication line, the transmitter superimposing a high-frequency signal on the pair of twisted wires to transmit electric power and signal. A receiver includes an aperture antenna being loop-shaped, the aperture antenna forming electromagnetic induction connection with an electromagnetic field generated in the pair of twisted wires according to electric currents flowing in the pair of twisted wires to receive high-frequency electric power of the pair of twisted wires. The aperture antenna of the receiver includes an opening area that is opposite to an opening area between a plurality of twisted portions of the pair of twisted wires. This enables a power line communication by strengthening the electromagnetic induction connection. Further, the use of the pair of twisted wires decreases leakage magnetic flux.

According to a second example of the present disclosure, a vehicular power line communication system is provided as follows. A transmitter includes a loop coil as a power line and a communication line, the transmitter superimposing a high-frequency signal on the loop coil to transmit electric power and signal. A receiver includes an aperture antenna being loop-shaped, the loop coil forming electromagnetic induction connection with an electromagnetic field generated in the loop coil according to electric currents flowing in the loop coil to receive high-frequency electric power of the loop coil. The loop coil includes an aperture-opposite opening area that is an opening area opposite to an opening area of the aperture antenna, the aperture-opposite opening area being formed to be larger than a different opening area of the loop coil other than the aperture-opposite opening area. This enables a power line communication by strengthening the electromagnetic induction connection.

BRIEF DESCRIPTION OF DRAWINGS

The above and other objects, features and advantages of the present disclosure will become more apparent from the following detailed description made with reference to the accompanying drawings. In the drawings:

FIG. 7(a) is a frequency characteristic diagram of a transmission characteristic, and FIG. 7(b) is a frequency characteristic diagram of leakage flux;

EMBODIMENTS OF CARRYING OUT INVENTION

First Embodiment

Figure 1:
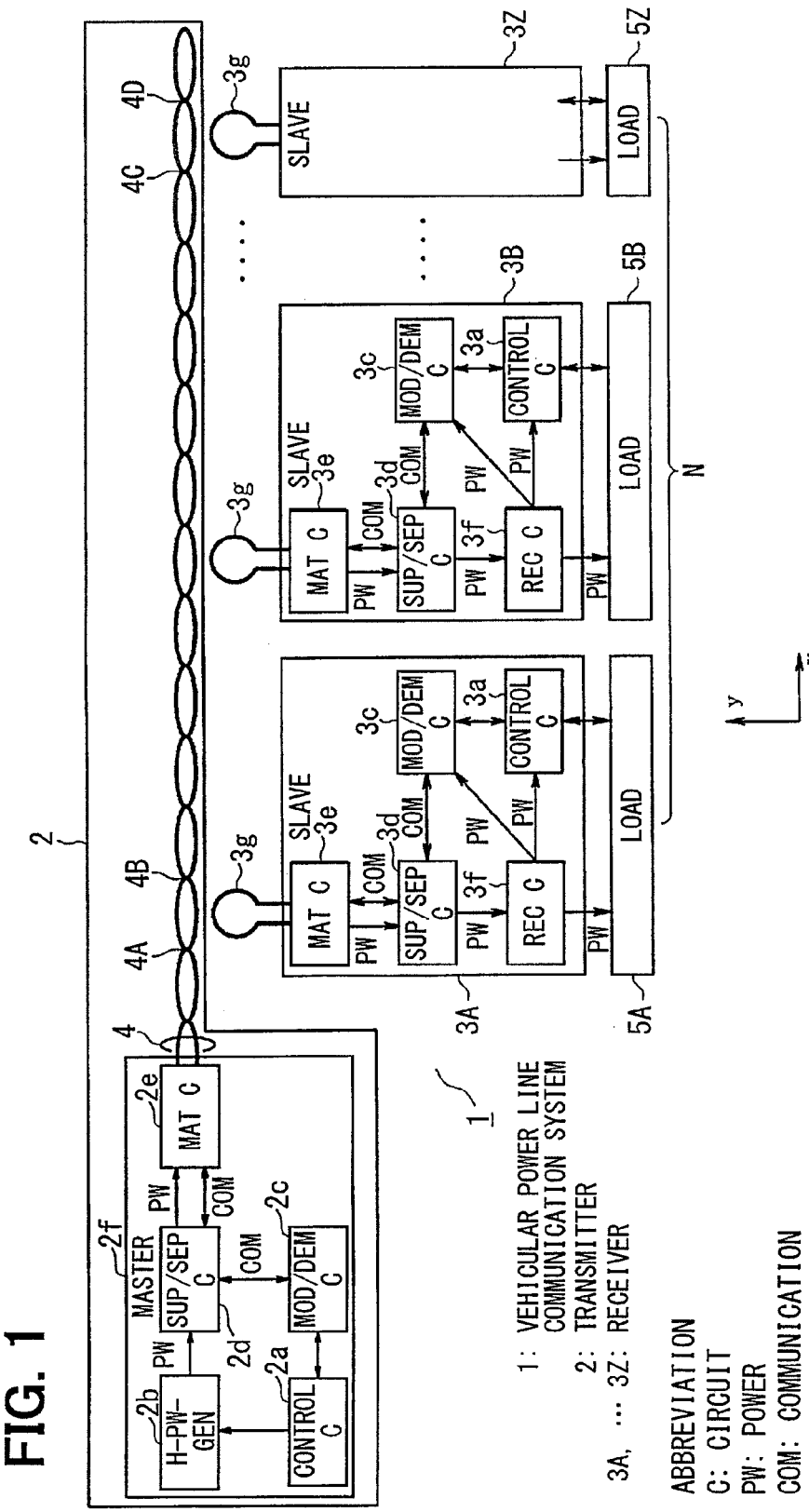
FIG. 1 is an electric block diagram schematically illustrating a vehicular power line communication system mounted in a vehicle according to a first embodiment of the present disclosure.
Figure 2:
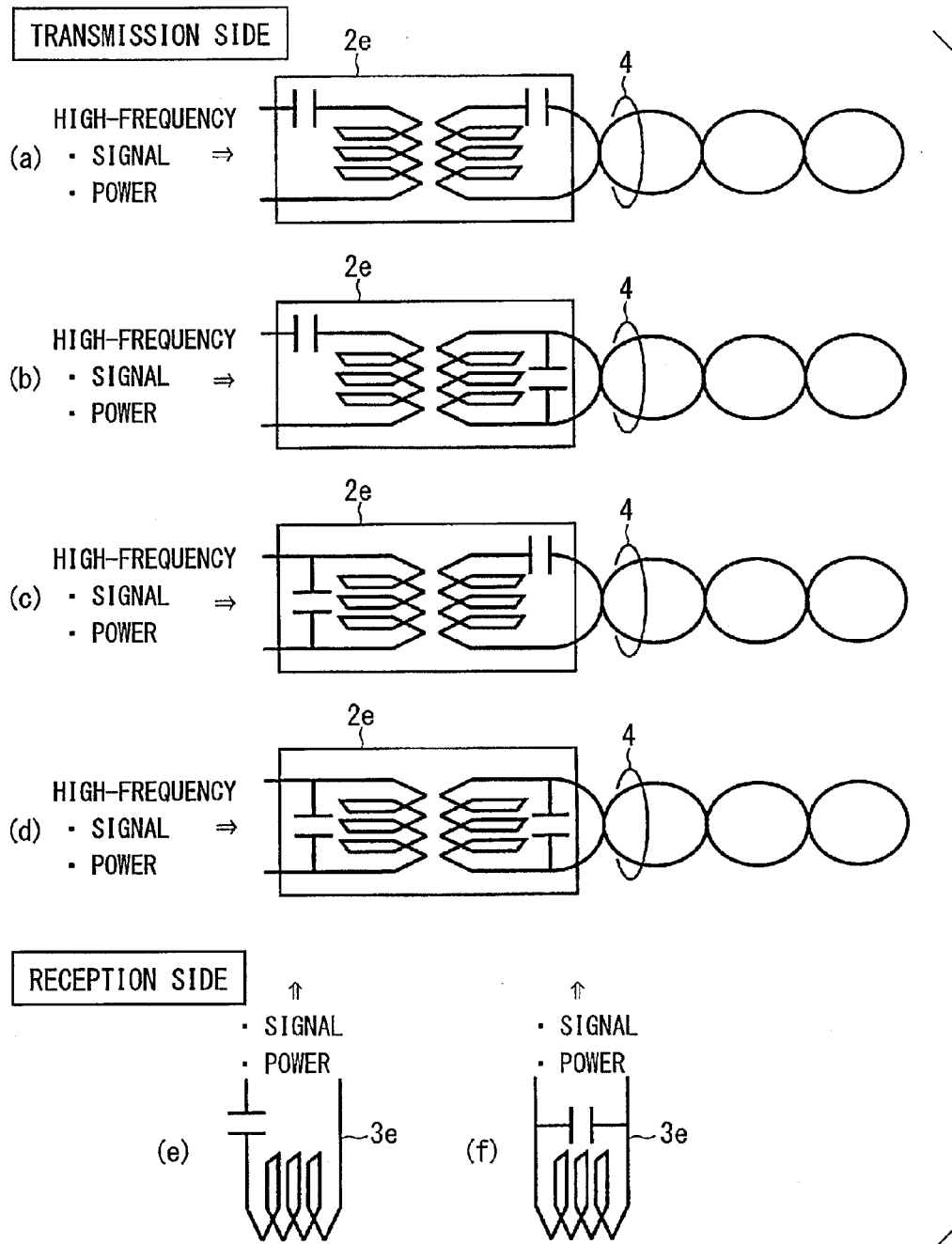
FIG. 2 is circuit diagrams indicating examples of matching circuits ((a)-(d) transmission side, (e)-(f) reception side)

The following explains a first embodiment with reference to FIGS. 1 to 4. FIG. 1 indicates schematically a configuration of a vehicular power line communication system.

A vehicular power line communication system 1 includes a communication apparatus (equivalent to a transmitter) 2 serving as a master, and communication apparatuses 3A . . . 3Z serving as slaves. The communication apparatus 2 is connected to a battery (not shown). The communication apparatus 2 supplies a plurality of communication apparatuses 3A . . . 3Z of slaves with an electric power according to an electric power of a battery (not shown) via a power line; the plurality of communication apparatuses 3A . . . 3Z of slaves operate depending on the supplied power. The communication apparatuses 3A . . . 3Z are connected with respective loads 5A . . . 5Z that include sensors and actuators.

The communication apparatus 2 of the master includes a main body 2f and a pair of twisted wires 4, which is connected with the main body 2f and serves as a transmission antenna. The main body 2f contains a control circuit 2a which controls communication and some other functions; a high-frequency power generation circuit 2b; a modulation and demodulation circuit 2c; a superimpose/separate circuit 2d; and a matching circuit 2e. The high-frequency power generation circuit 2b generates a high-frequency signal (carrier signal) depending on a control signal of the control circuit 2a, and outputs the generated signal as a power signal to the superimpose/separate circuit 2d.

The modulation and demodulation circuit 2c modulates communication data of the master, and outputs communications data to the superimpose/separate circuit 2d as a modulating signal. The superimpose/separate circuit 2d mixes the carrier signal and modulating signal, and outputs them to the matching circuit 2e.

FIG. 2(a) to FIG. 2(d) illustrate equivalent circuits of the matching circuit 2e. The matching circuit 2e includes a transformer; a capacitor which is connected to the primary side of the transformer in series or parallel; and a capacitor which is connected to the secondary side of the transformer in series or parallel. The matching circuit 2e transmits a carrier signal (power and signal), which a modulating signal is superimposed on, to the pair of twisted wires 4. The twisted wires 4 are installed in the vehicle and extended from an output terminal of the main body 2f to a farthest portion about one meter away. As indicated in FIG. 1 and FIG. 2, the pair of twisted wires 4 are formed to be loop-shaped to connect the far ends (ends) of cable core wires to each other.

Each communication apparatus 3A . . . 3Z of the slave contains a control circuit 3a; a modulation and demodulation circuit 3c; a superimpose/separate circuit 3d; and a matching circuit 3e; and a rectification circuit 3f. The matching circuit 3e is connected to an aperture antenna 3g for reception. This aperture antenna 3g is formed to be shaped of a loop such as a circle; the antenna 3g receives an electromagnetic field generated by the pair of twisted wires 4 with electromagnetic induction connection.

FIG. 2(e) to FIG. 2(f) illustrate equivalent circuits of the matching circuit 3e of the reception side. The matching circuit 3e is a matching circuit, which includes a capacitor connected to the aperture antenna 3g in parallel or in series and transmits the carrier signal (power and signal), when receiving, to the superimpose/separate circuit 3d. The superimpose/separate circuit 3d divides the received carrier signal into a power AC signal and a communication data signal and transmits the power AC signal to the rectification circuit 3f. The rectification circuit 3f rectifies the power AC signal to form direct current power and supply the direct current power to the modulation and demodulation circuit 3c, the control circuit 3a, and the load 5A. The modulation and demodulation circuit 3c operates on the supplied power, demodulates the communications data signal, and transmits the data to the control circuit 3a.

The control circuit 3a operates on electric power supplied from the rectification circuit 3f, receives the demodulated data from the modulation and demodulation circuit 3c, and actuates the load 5A . . . 5Z. Thereby, the data may be transmitted from the master to the slave. The slave acquires a sensor signal when the load 5A . . . 5Z is a sensor, and actuates an actuator when the load 5A . . . 5Z is the actuator.

On the contrary, when the slave transmits data to the master, the following takes place. The control circuit 3a of the communication apparatus 3A . . . 3Z modulates the data by the modulation and demodulation circuit 3c, and transmits the modulating signal to the superimpose/separate circuit 3d. The superimpose/separate circuit 3d superimpose the modulating signal of the modulation and demodulation circuit 3c on the carrier signal, and outputs to the matching circuit 3e. The matching circuit 3e outputs the carrier signal, which the modulating signal is superimposed on, to the aperture antenna 3g; the aperture antenna 3g then outputs the carrier signal as a radio wave signal.

The pair of twisted wires 4 are extended from the main body 2f of the communication apparatus 2 of the master to proximity of each of the communication apparatuses 3A . . . 3Z of slaves. The pair of twisted wires 4 are twisted pair cables of UTP (unsealed twisted pair) to which the shielding is not given, for example. In the signal transmission with the pair of twisted wires 4, the electric current with the high-frequency signal generates a magnetic flux in between the adjoining twisted points (equivalent to the twisted portions) 4A, 4B, . . . ; the magnetic fluxes adjoining are reversed to thereby cancel each other. This hardly outputs noise externally. In addition, in the signal reception, the twisted wires 4 have a small area in which the magnetic fluxes interlink according to the electric waves coming from the outside. This hardly receives the influence of the electric waves coming from the outside. Therefore, the configuration is suitable for noise generation control and extraneous noise elimination.

Among multiple opening areas between the multiple twisted portions 4A, . . . in the twisted wires 4, an opening area in between the twisted portion 4A and the twisted portion 4B faces or is opposite to the aperture antenna 3g of the communication apparatus 3A. In addition, although part of reference signs are not illustrated, similarly, the respective aperture antennas 3g of the communication apparatuses 3B . . . 3Z face or are opposite to the opening areas in between the twisted portions (for instance, the aperture antennas 3g of the communication apparatus 3Z faces the opening area in between the twisted potion 4C and the twisted portion 4D).

In order to illustrate configuration of the twisted portions 4A, 4B, . . . , 4C, 4D in FIG. 1 in an easily understood manner, the opening area (in between the twisted portion 4A and the twisted portion 4B) of the twisted wires 4 and the opening area of the aperture antenna 3g match each other only in the x direction; however, they match each other also in the y direction. These two opening areas are provided to overlap with each other.

Therefore, the electromagnetic field generated in each of the opening areas in between the twisted portions (4A, 4B, . . . , 4C, 4D) of the twisted wires 4 forms the strong electromagnetic induction connection with the aperture antenna 3g of the communication apparatus 3A . . . 3Z. Each aperture antenna 3g of the communication apparatus 3A . . . 3Z can receive in a contactless manner an electric power and a signal with the electromagnetic field generated in the opening area in between the twisted portions 4A and 4B (4C and 4D) of the twisted wires 4 according to the high-frequency signal. Further, by contrast, when each communication apparatus 3A . . . 3Z transmits a signal from the aperture antenna 3g, the communication apparatus 2 can receive a signal in a contactless manner via the opening areas in between the twisted portions (4A, 4B, . . . , 4C, 4D) of the twisted wires 4.

Figure 3:
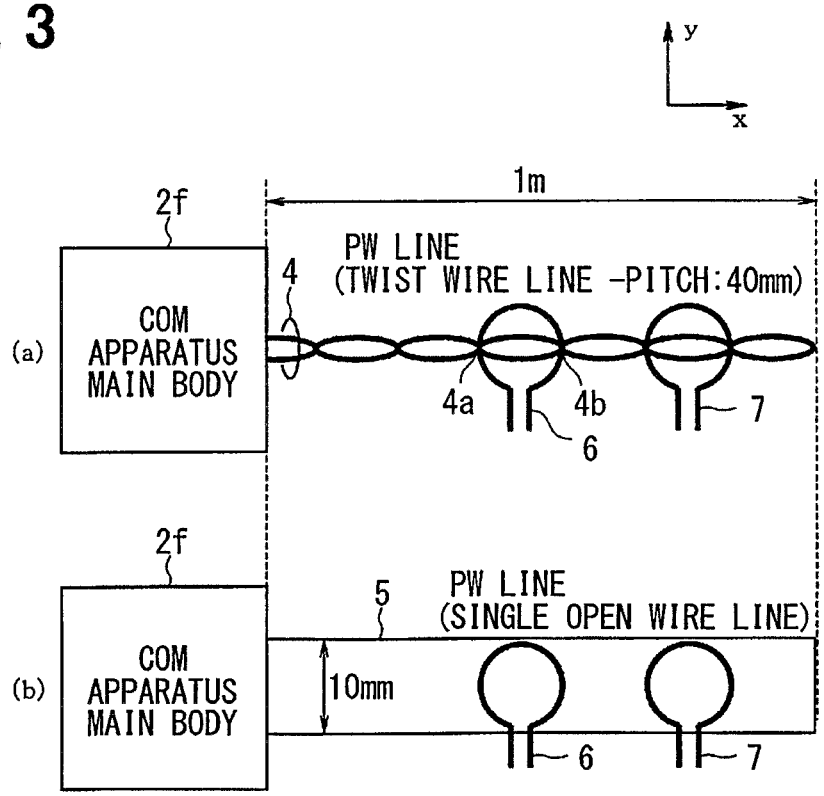
FIG. 3 is a diagram for explaining an experimental condition ((a) is a line of a pair of twisted wires; (b) is a line of a single opening wire)
Figure 4:
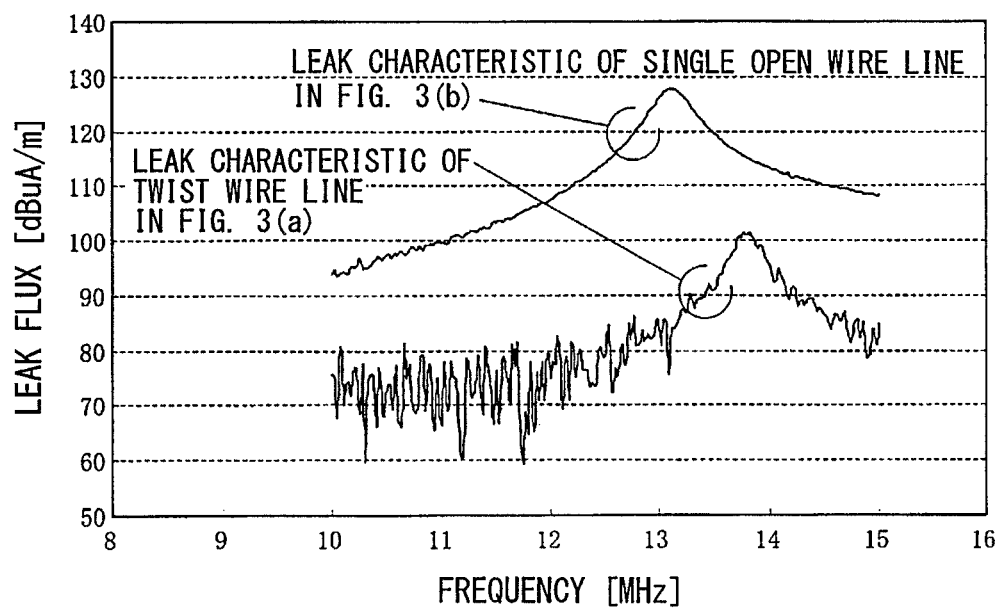
FIG. 4 is a frequency characteristic diagram indicating an experimental result of leak electric power.

FIG. 3 (a) indicates a measurement condition of the leakage flux in an experiment made by Inventors; FIG. 3 (b) indicates a measurement condition of the leakage flux in a comparative example. FIG. 4 indicates the frequency characteristics of those experimental results.

With reference to FIG. 3(a), the pair of twisted wires 4 is configured such that two core wires extend in twisted form linearly from the main body 2f of the communication apparatus 2 to an end portion about a predetermined length (1 [m]) in a predetermined direction (x direction) with predetermined twist pitches and connect with each other at the end portion. The twist pitch (an interval or predetermined pitch in between multiple twisted portions 4a, 4b, . . . ) is set to 20 [mm]. The core wires are covered with a covering material, the thickness of which is 0.35 [mm]; an interval in between the respective core wires of the pair of the twisted wire 4 turns out to be 0.7+α [mm].

In addition, FIG. 3 (b) is a comparative example of a wire line 5 (hereinafter referred to as a single opening wire line), which is configured such that the core wires extend in a predetermined direction (x direction) to a longitudinal end portion and connect with each other to form the wire line 5, for indicating leakage flux characteristic. The comparative example has a configuration of the wire line 5 where the core wires are separated from each other in a lateral direction (y direction) by a predetermined interval (10 [mm]) while being extended linearly in a predetermined direction (x direction) by a predetermined length (1 [m]) and connected with each other at the end portion. The lateral direction (y direction) is orthogonal to the extended direction (x direction) of the twisted wires 4.

Inventors measure leakage flux under the measurement condition in FIG. 3(a) as follows. The aperture antenna 3g for reception is supposed to be a measurement antenna 6. The measurement antenna 6 is disposed to be separate from a reference antenna 7 for leak power measurement with a gap which permits prevention of the mutual influence of the two antennas 6 and 7. The base end (the terminal portion connected with the main body 2f) of the pair of twisted wires 4, the antenna 6 for measurement, and the reference antenna 7 are connected to respective different ports of a network analyzer. The base end of the pair of twisted wires 4 is supplied with a reference electric power for measurement (0 dBm: a frequency of about ten MHz). While a reception power is measured with the antenna 6 for measurement, the leakage flux is measured with the reference antenna 7.

In addition, Inventors measure leakage flux under the measurement condition of the comparative example in FIG. 3(b) as follows. The aperture antenna 3g for reception is supposed to be a measurement antenna 6. The measurement antenna 6 is disposed to be separate from a reference antenna 7 for leak power measurement with a gap similar to that in FIG. 3(a). The base end (the terminal portion connected with the main body 2f) of the single opening wire line 5, the antenna 6 for measurement, and the reference antenna 7 are connected to respective different ports of a network analyzer. The base end of the single opening wire line 5 is supplied with a reference electric power for measurement (0 dBm: a frequency of about ten MHz). While a reception power is measured with the antenna 6 for measurement, the leakage flux is measured with the reference antenna 7.

The leakage flux characteristics indicated in FIG. 4 indicates that the configuration using a pair of twisted wires 4 as indicated in FIG. 3 (a) can reduce the leakage flux as compared with that using a single opening wire line 5 as indicated in FIG. 3 (b).

That is, the configuration using the single opening wire line 5 provides a peak value of about 128 [dBµA/m] at a communication frequency of about 13 [MHz]; in contrast, the configuration using the pair of twisted wires 4 provides a peak value of about 101 [dBµA/m] at a communication frequency of about 13.8 [MHz] and can reduce the leakage flux over an overall range of the measured frequencies.

In the present embodiment, an opening area in between the twisted portions 4A to 4B of the twisted wires 4 faces an opening area of the aperture antenna 3g of each communication apparatus 3A . . . 3Z; thus, the pair of twisted wires 4 can divide the electric power while communicating signals. The present embodiment can reduce the leakage flux as compared with the communication using the single opening wire line 5. Thereby, the electric power and the signal can be propagated efficiently. In addition, a contactless power line communication can be achieved in between the communication apparatus 2 and the communication apparatuses 3A . . . 3Z.

The communication apparatus 2 can distribute the electric power and signals among the communication apparatuses 3A . . . 3Z without using any other components such as a harness or a connector.

Second Embodiment

Figure 5:
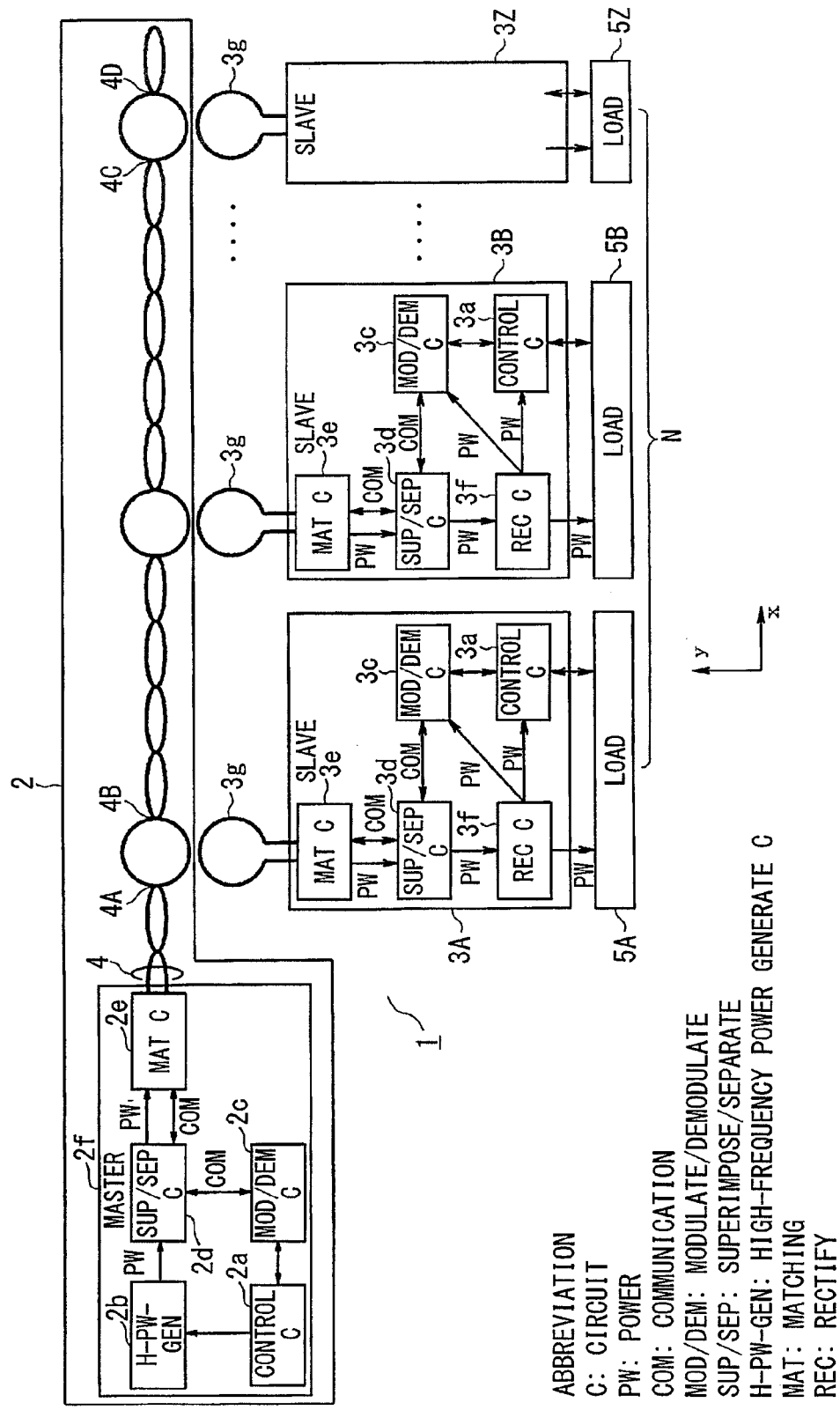
FIG. 5 is a diagram, which is comparable with FIG. 1, according to a second embodiment of the present disclosure.
Figure 6:
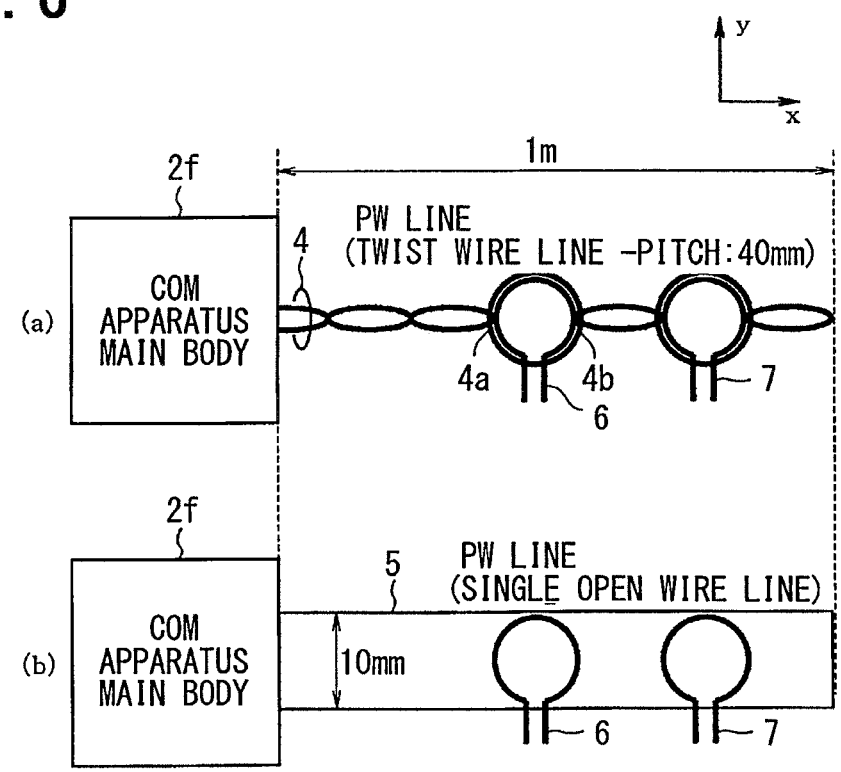
FIG. 6 is a diagram comparable with FIG. 3.

FIG. 5 to FIG. 7 indicate a second embodiment of the present disclosure. The second embodiment is different from the above-mentioned embodiment in that the opening areas between a plurality of twisted portions of the pair of twisted wires include an opening area facing an aperture antenna and a different opening area other than the opening area facing the aperture antenna and only the opening area facing the aperture antenna is configured to be larger than the different opening area. Portions identical to those in the above-mentioned embodiment are assigned with the identical reference signs and omitted from the explanation; the different portions will be explained below.

With reference to FIG. 5, among opening areas formed by the twisted portions of the pair of twisted wires 4, only an opening area between the twisted portion 4A and the twisted portion 4B is enlarged in a lateral direction (y direction). The opening area between the twisted portion 4A and the twisted portion 4B of the twisted wires 4 is arranged to be opposite to the opening area of the aperture antenna 3g. FIG. 5 illustrates a configuration of twisted portions 4A, 4B, . . . , 4C of the twisted wires 4 in an easily understood manner in particular. Thus, the opening area of the twisted wires 4 (in between the twisted portions 4A to 4B) is opposite to the opening area of the aperture antenna 3g in the x direction alone; however, those opening areas are opposite to each other also in the y direction actually to overlap with each other.

In order to confirm an advantageous effect of improving the power transmission characteristic in the present embodiment, Inventors made the following experiments. FIG. 6(a) indicates an experimental condition of the present embodiment; FIG. 6(b) indicates an experimental condition of a comparative example. In addition, FIG. 7(a) indicates an experimental result of the power transmission characteristic. FIG. 7(b) indicates an experimental result of leak power characteristic.

The experimental condition in FIG. 6(a) indicates a measurement using the configuration where the opening area between the twisted portion 4a and the twisted portion 4b of the twisted wires 4 has a lateral diameter similar to that of the aperture antenna 3g. The comparative example in FIG. 6(b) indicates that the antenna 6 for measurement and the reference antenna 7 are opposite to each other in the single opening wire line 5. Other experimental conditions are similar to those in the above-mentioned embodiment.

FIG. 7(a) indicates that the single opening wire line 5 and the twisted wires 4 provide a similar largest value of the transmission characteristic. In addition, FIG. 7(b) indicates that the twisted wires 4 provides a leakage flux characteristic more effective than the single opening wire line 5. This proves that the second embodiment can strengthen the electromagnetic induction connection in between the twisted wires 4 and the aperture antenna 3g as compared with the above-mentioned embodiment.

As explained, the present embodiment provides the configuration where among the opening areas in between the twisted portions of the pair of twisted wires 4, only an opening area, which is in between the twisted portion 4A (4a) and the twisted portion 4B (4b) and is opposite to the aperture antenna 3g, is provided to be larger than other opening areas that is not opposite to the aperture antenna 3g; this configuration can strengthen the electromagnetic induction connection while suppressing the leakage of the high frequency electric power.

Third Embodiment

Figure 8:
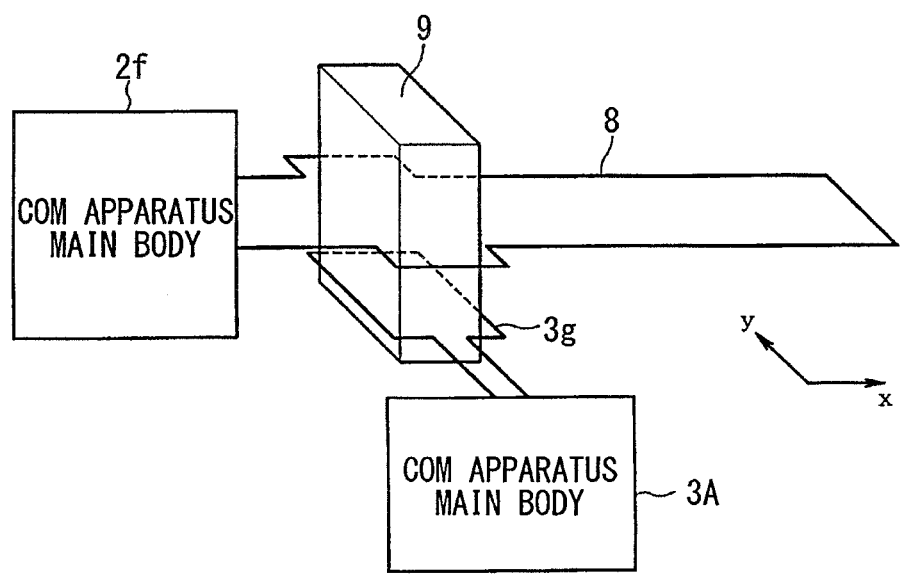
FIG. 8 is a diagram indicating an arrangement example of a power communication line according to a third embodiment of the present disclosure.

FIG. 8 indicates a third embodiment of the present disclosure. The third embodiment is different from the above-mentioned embodiments in that a loop coil is used for power line communication by replacing a pair of twisted wires whose core wires are connected at the end portion; an opening area of the loop coil facing an opening area of an aperture antenna of a receiver is configured to be larger than other opening areas. Portions identical to those in the first embodiment are assigned with the reference signs identical to those in the first embodiment and omitted from the explanation; the different portions are only explained on a priority basis.

FIG. 8 illustrates a configuration example of an antenna portion of the present embodiment. As indicated in FIG. 8, the loop coil 8 is configured to be shaped of a loop to be extended linearly from the main body 2f of the communication apparatus 2 in a predetermined direction (x direction) while the core wires are connected at the end portion of the loop coil 8. The loop coil 8 is configured to have an enlarged portion among portions in a lateral direction (y direction); the enlarged portion is opposite to the aperture antenna 3g for reception and has a larger interval between the core wires than intervals of other portions in the lateral direction.

The main body 2f of the communication apparatus 2 superimposes a high-frequency signal on the loop coil 8 to transmit electric power and a signal. The communication apparatus 3A . . . 3Z (3B . . . 3Z are unshown) receives a carrier signal (electric power and signal) of the loop coil 8 using the loop-shaped aperture antenna 3g via the electromagnetic induction connection with the electromagnetic field generated in the loop coil 8 according to the electric current in the loop coil 8.

As explained above, the loop coil 8 includes partially, in a lateral direction (y direction), an enlarged portion that is only provided at a portion opposite to or facing the aperture antenna 3g for reception; the core wires of the enlarged portion has an interval larger than other intervals of other portions in the lateral direction. This can strengthen the electromagnetic induction connection. In addition, as illustrated in FIG. 8, a core 9 such as ferrite may be provided between the opening area of the loop coil 8 and the opening area of the aperture antenna 3g as needed.

Under the present embodiment, the loop coil 8 is used for power line communication; an opening area of the loop coil 8 facing an opening area of the aperture antenna 3g of the communication apparatuses 3A . . . 3Z is formed to be larger than other opening areas. Thus, the electromagnetic induction connection can be strengthened, in particular, like the first embodiment.

Other Embodiments

The present disclosure is not limited to the embodiments described above and illustrated in the drawings, and can be modified or expanded as follows.

In the first embodiment and the second embodiment, the core 9 explained in the third embodiment may be inserted in between the opening area of the aperture antenna 3g and the opening area between the twisted portions 4A-4B (4a-4b) of the twisted wires 4.

Figure 9:
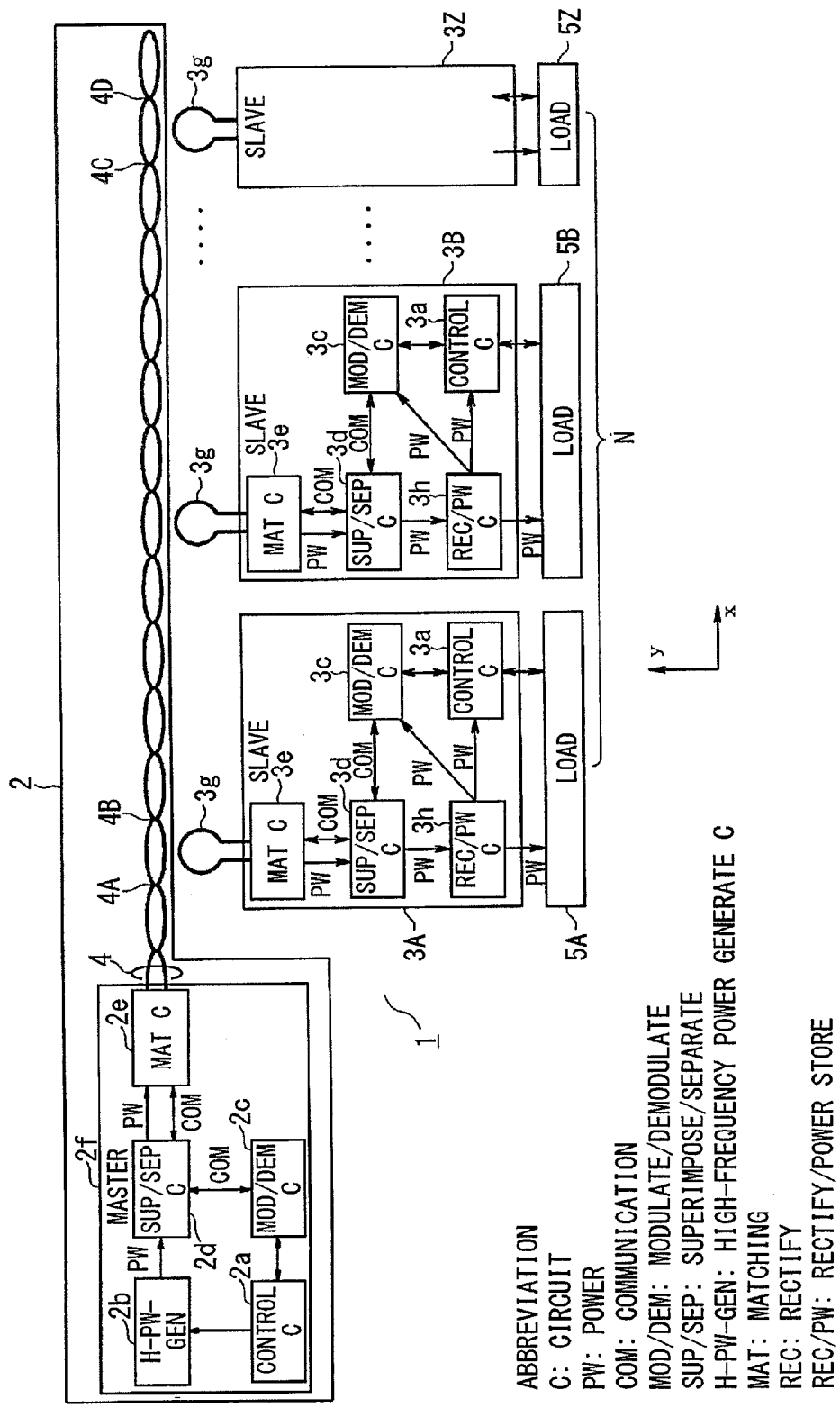
FIG. 9 is a diagram, which is comparable with FIG. 1, according to another embodiment of the present disclosure.

As indicated in FIG. 9, the communication apparatuses 3A . . . 3Z may include a rectification/power storage circuit 3h by replacing the rectification circuit 3f. FIG. 9 illustrates a configuration of twisted portions 4A, 4B, . . . , 4C, 4D of the twisted wires 4 in an easily understood manner in particular. Thus, the opening area of the twisted wires 4 (in between the twisted portions 4A to 4B) is opposite to the opening area of the aperture antenna 3g in the x direction alone; however, those opening areas are opposite to each other also in the y direction actually to overlap with each other.

The rectification/power storage circuit 3h is to store electric power when being supplied with the electric power from the communication apparatus 2 of the master. In this case, even if the electric power supply is not carried out from the communication apparatus 2, each communication apparatus 3A . . . 3Z can operate independently with the stored electric power. Therefore, the loads 5A . . . 5Z (sensor, actuator) connected with the communication apparatuses 3A . . . 3Z can be operated independently.

Aspects of the subjects described above are set forth as follows.

According to a first aspect, a vehicular power line communication system is provided as follows. A transmitter includes a pair of twisted wires, whose ends are connected to each other to be loop-shaped, as a power line and a communication line, the transmitter superimposing a high-frequency signal on the pair of twisted wires to transmit electric power and signal. A receiver includes an aperture antenna being loop-shaped, the aperture antenna forming electromagnetic induction connection with an electromagnetic field generated in the pair of twisted wires according to electric currents flowing in the pair of twisted wires to receive high-frequency electric power of the pair of twisted wires. The aperture antenna of the receiver includes an opening area that is opposite to an opening area between a plurality of twisted portions of the pair of twisted wires. This enables a power line communication by strengthening the electromagnetic induction connection. Further, the use of the pair of twisted wires decreases leakage magnetic flux.

According to a second aspect, a vehicular power line communication system is provided as follows. A transmitter includes a loop coil as a power line and a communication line, the transmitter superimposing a high-frequency signal on the loop coil to transmit electric power and signal. A receiver includes an aperture antenna being loop-shaped, the loop coil forming electromagnetic induction connection with an electromagnetic field generated in the loop coil according to electric currents flowing in the loop coil to receive high-frequency electric power of the loop coil. The loop coil includes an aperture-opposite opening area that is an opening area opposite to an opening area of the aperture antenna, the aperture-opposite opening area being formed to be larger than a different opening area of the loop coil other than the aperture-opposite opening area. This enables a power line communication by strengthening the electromagnetic induction connection.

According to a third aspect, among opening areas in between a plurality of twisted portions adjoining of a pair of twisted wires, only an opening area opposite to an aperture antenna of the receiver is formed to be larger than a different opening area in the twisted portions adjoining. This enables a power line communication by further strengthening the electromagnetic induction connection.

According to a fourth aspect, a core is inserted in between the opening areas opposite to each other. This enables a power line communication by strengthening the electromagnetic induction connection.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular power line communication system comprising:
   a transmitter including a pair of twisted wires, whose ends are connected to each other to be loop-shaped, as a power line and a communication line, the transmitter superimposing a high-frequency signal on the pair of twisted wires to transmit electric power and a signal;
   a receiver including (i) an aperture antenna being loop-shaped and (ii) a circuit, the aperture antenna forming electromagnetic induction connection with an electromagnetic field generated in the pair of twisted wires according to electric currents flowing in the pair of twisted wires to receive high-frequency electric power of the pair of twisted wires, the circuit operating by using the electric power transmitted from the transmitter; and
   a matching circuit including a capacitor that is connected in series or parallel to the pair of twisted wires and/or the aperture antenna,
   wherein the aperture antenna of the receiver includes an opening area that is opposite to an opening area between a plurality of twisted portions of the pair of twisted wires.

2. A vehicular power line communication system comprising:
   a transmitter including a loop coil as a power line and a communication line, the transmitter superimposing a high-frequency signal on the loop coil to transmit electric power and a signal;
   a receiver including (i) an aperture antenna being loop-shaped and (ii) a circuit, the loop coil forming electromagnetic induction connection with an electromagnetic field generated in the loop coil according to electric currents flowing in the loop coil to receive high-frequency electric power of the loop coil, the circuit operating by using the electric power transmitted from the transmitter; and
   a matching circuit including a capacitor that is connected in series or parallel to the loop coil and/or the aperture antenna,
   wherein the loop coil of the transmitter includes an aperture-opposite opening area that is an opening area opposite to an opening area of the aperture antenna, the aperture-opposite opening area being formed to be larger than a different opening area of the loop coil other than the aperture-opposite opening area.

3. The vehicular power line communication system according to claim 1, wherein:
   the pair of twisted wires includes a plurality of twisted portions and a plurality of opening areas between the twisted portions adjoining; and
   among the plurality of opening areas, only an opening area that is opposite to the aperture antenna of the receiver is formed to be larger than a different opening area other than the opening area opposite to the aperture antenna.

4. The vehicular power line communication system according to claim 2, wherein
   a core is inserted in between the opening area of the aperture antenna and the aperture-opposite opening area that is formed to be larger in the loop coil.

5. The vehicular power line communication system according to claim 1, wherein
   a core is inserted in between the opening area of the aperture antenna and an opening area in the pair of twisted wires.

6. A transmitter of the vehicular power line communication system according to claim 1, wherein
   the pair of twisted wires includes an opening area between the twisted portions adjoining, the opening area being formed to be larger than a different opening area in the twisted portions adjoining.

7. A transmitter of the vehicular power line communication system according to claim 2, wherein
   the loop coil includes a part of the opening area, the part being formed to be larger than a different part of the opening area.

8. The vehicular power line communication system according to claim 1, wherein
   the receiver includes a separating circuit connected to the aperture antenna, configured to divide a received transmission into the electric power and the signal.

9. The vehicular power line communication system according to claim 2, wherein
   the circuit includes a separating circuit configured to divide a received transmission into the electric power and the signal.

10. The vehicular power line communication system according to claim 1, wherein
    the transmitter includes a superimpose circuit connected to the loop coil, configured to mix the electric power and the signal into a single transmission.

11. The vehicular power line communication system according to claim 2, wherein
    the transmitter includes a superimpose circuit connected to the loop coil, configured to mix the electric power and the signal into a single transmission.

* * * * *